United States Patent [19]

Snyder

[11] 4,101,498

[45] Jul. 18, 1978

[54] FIRE-RESISTANT COMPOSITION

[75] Inventor: John L. Snyder, Houston, Tex.

[73] Assignee: Shell Oil Company, Houston, Tex.

[21] Appl. No.: 690,762

[22] Filed: May 27, 1976

[51] Int. Cl.$^2$ .......................... C08K 5/01; C08L 51/00
[52] U.S. Cl. .......................... 260/33.6 AQ; 260/42.45; 260/42.44; 260/45.7 R; 260/45.75 B; 260/45.75 W; 260/876 B
[58] Field of Search .................. 260/876 B, 33.6 AQ, 260/45.7 R, 45.75 B, 45.75 W; 106/15 FP

[56] References Cited

U.S. PATENT DOCUMENTS

| | | | |
|---|---|---|---|
| 3,385,819 | 5/1968 | Gouinlock | 260/45.75 |
| 3,483,272 | 12/1969 | Hindersinn | 260/876 B |
| 3,595,942 | 7/1971 | Wald et al. | 260/880 B |
| 3,676,387 | 7/1972 | Lindlof | 260/876 B X |
| 3,980,736 | 9/1976 | Agouri et al. | 260/876 B |

*Primary Examiner*—Thomas De Benedictis, Sr
*Attorney, Agent, or Firm*—Dean F. Vance

[57] ABSTRACT

An oil-resistant, fire-resistant polymer composition is disclosed which is useful in coating electrical conductors. The composition comprises a block copolymer, extending oil, polymeric alpha-olefin, filler and fire retardant package comprising antimony trioxide, an adduct of hexachlorocyclopentadiene and a zinc borate.

10 Claims, No Drawings

FIRE-RESISTANT COMPOSITION

BACKGROUND OF THE INVENTION

Various materials have been utilized in the past for coating and insulating electrical conductors. Among the more commonly used coatings are the conventional enamel or resinous varnish-type coating, polyvinyl resins, polystyrene resins, etc. All these coating compositions, while providing insulation, have been found to be lacking in one respect or another or to inherently involve certain disadvantages. For example, the enamel or varnish coatings lack adequate flexibility. Rubber coatings such as polybutadiene, ethylene-propylene rubbers, and natural rubber require vulcanization in order to obtain their maximum desired set of physical properties. Furthermore, most rubber coatings deteriorate with age and exposure to the atmosphere, resulting in the cracking and peeling of the rubber coatings. The polyvinyl and polystyrene resin coatings must be plasticized in order to have sufficient flexibility. Such coatings often lose plasticizers during aging and then become brittle.

Recent improvements in the art of polymerization have enabled the production of certain block copolymers which have been found to be eminately suitable for electrical conductor coatings in view of their unexpectedly superior set of electrical properties combined with their superior physical properties. However, these coatings, such as the coatings disclosed in U.S. Pat. No. 3,639,163, lack sufficient fire resistance and oil resistance to be used in numerous desirable applications.

SUMMARY OF THE INVENTION

A novel oil-resistant, fire-resistant polymer composition has been found that is very suitable for the coating of electrical conductors for use in high temperature service. This composition comprises a selectively hydrogenated block copolymer, an extending oil, inorganic filler, polymeric alpha-olefin, and a fire-retardant package comprising antimony trioxide, a zinc borate, and either perchloropentacyclodecane or an adduct of hexachlorocyclopentadiene and 1,5-cyclooctadiene. This novel composition not only is flame and fire-resistant, but also is relatively oil-resistant. For example, an identical polymer composition without the flame retardant package employed in the instant composition shows nearly a 25% greater volume increase when contacted with 10w-40 motor oil (according to standard test ASTM D471) than does the instant composition.

DETAILED DESCRIPTION OF THE INVENTION

The instant invention is an oil-resistant, fire-resistant polymer composition comprising:
(a) 100 parts by weight of a block copolymer having at least two polymer end blocks A and at least one polymer mid block B, each block A being a nonelastomeric polymer block of a monoalkenyl arene having an average molecular weight of between about 2,000 and about 125,000 and each block B being an elastomeric hydrogenated polymer block of a conjugated diene, having an average molecular weight between about 10,000 and about 250,000;
(b) 0–200 parts by weight of an extending oil;
(c) 10–300 parts by weight of a polymeric alpha-olefin;
(d) 0–200 parts by weight of an inorganic filler;
(e) 5–100 parts by weight of antimony trioxide;
(f) 5–100 parts by weight of a zinc borate; and
(g) 20–300 parts by weight of a flame retardant selected from the group consisting of perchloropentacyclodecane, the adduct

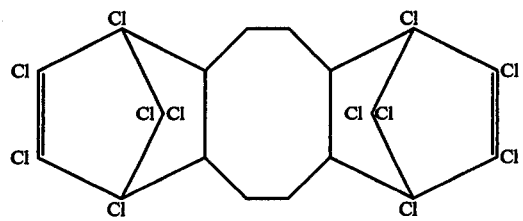

and mixtures thereof.

The block copolymers contemplated for use in these compositions have two essential types of blocks, A and B. At least two blocks A are present and at least one block B is present in the block copolymer. The copolymer may be either linear or branched in structure and mixtures of such configurations may be employed. Blocks A comprise predominantly polymer blocks of at least one monoalkenyl arene while blocks B comprise predominantly hydrogenated polymer blocks of at least one conjugated diene. Moreover, blocks A are characterized in that no more than 25% of the originial aromatic double bonds are reduced by hydrogenation while blocks B are characterized by having at least 75% of their aliphatic double bonds reduced by hydrogenation. It is possible, in fact, to prepare block copolymers in which the blocks B are poly(alphamonoolefin) blocks which are regarded here as being substantially equivalent to substantially completely hydrogenated polymer blocks of conjugated dienes. The remaining specification and the claims are meant to include within their scope these alphamonoolefin equivalents of fully hydrogenated polymer blocks of conjugated dienes.

Blocks A are prepared by block polymerization of such monomers as styrene, alphamethyl styrene, tert-butyl styrene and vinyl toluene. Block B are prepared by block polymerization conjugated dienes such as butadiene or isoprene and thereafter hydrogenating the polymer block. When the diene employed is butadiene, it is preferred that polymerization conditions be adjusted to result in a polymer block having from about 35 to about 55% 1,2 structure. Thus, when such a block is hydrogenated, the resulting product is, or resembles, a regular copolymer block of ethylene and butene-1 (EB). If the conjugated diene employed in isoprene, the resulting hydrogenated product is or resembles a regular copolymer block of ethylene and propylene (EP). See generally U.S. Pat. No. 3,595,942.

For simplicity, reference will be made to several basic types of block copolymers especially contemplated herein. However, it will be understood that block copolymers may be prepared by coupling polymeric lithium carbanions, some of which may leave coupling agent residues. Linear as well as branched multi-block structures also are contemplated. The methods are known in the art for synthesizing both linear and branched block copolymers, using sequential polymerization alone or sequential polymerization followed by coupling procedures.

Typical block copolymers especially contemplated are the following:

1. Polystyrene-hydrogenated polybutadiene-polystyrene.
2. Polystyrene-hydrogenated polyisoprene-polystyrene.
3. Poly(alphamethyl styrene)-hydrogenated polybutadienepoly(alphamethyl styrene).
4. Poly(alphamethyl styrene)-hydrogenated polyisoprenepoly(alphamethyl styrene).

Each block A has an average molecular weight between about 2,000 and 125,000, preferably between about 5,000 and 50,000. Each block B has an average molecular weight between about 10,000 and 250,000, preferably between about 30,000 and 150,000. These are number average molecular weights determined by such methods as tritium counting or osmotic pressure measurements. The A block content of the block copolymer is preferably between about 20% and about 60% based on the total weight of the copolymer. The purpose of the latter restriction is to promote the self-vulcanizing feature of these particular materials, which is important in maintaining the favorable electrical properties of the composition.

The term "extending oils" as used in the description of this invention, broadly encompasses not only the usual extending oils for rubbers prepared from petroleum fractions but also contemplates the use of olefin oligomers and low molecular weight polymers. The petroleum derived extending oils which may be employed include relatively high boiling materials having number average molecular weights between about 300 and 1,400. The oligomers may be polypropylenes, polybutenes, hydrogenated polyisoprene, hydrogenated polybutadiene, or the like having average molecular weights between about 350 and about 10,000. The amount of extending oil employed varies from about 0 to about 200 phr (parts by weight per hundred parts by weight of rubber), preferably about 50 to about 100 phr.

The polymeric alpha-olefin component is preferably isotactic polypropylene, which is an essentially crystalline polypropylene. The solid isotactic polypropylene has a weight average molecular weight of between about 200,000 and about 300,000, preferably between about 225,000 to about 275,000. The amount of polymeric alpha-olefin employed typically varies from about 10 to about 300 phr, preferably about 50 to about 150 phr.

Suitable inorganic fillers include calcium carbonate, talc, from oxide, carbon blacks, silica, calcium silicate and alumina. Preferred fillers are calcium carbonate and talc. Other additives such as pigments and extenders may also be added. The additives that can be incorporated should be selected from those whose electrical properties are such as will not materially reduce or impair the electrical properties of the composition. The amount of such additives included in the composition will, of course, depend upon the particular block copolymer being employed and the ultimate use being made of the composition. Typical amounts of fillers range from about 50 to about 300 phr, preferably about 150 to about 250 phr.

The flame retardant package employed in the present composition is a combination of three separate components: a zinc borate, antimony trioxide and a particular group of adducts of hexachlorocyclopentadiene. In order to obtain both the desired fire-resistance and oil-resistance required at an acceptable commercial cost, it is necessary that all three components be present. For example, the zinc borate by itself is ineffective as a flame retardant. By adding antimony trioxide to the zinc borate, it is possible to improve the flame retardancy. However, antimony trioxide is very expensive, and too much antimony results in a poor tensile strength for the composition. Accordingly, it is necessary in order to have good tensile strength, good flame retardance, oil resistance, and an acceptable cost that the particular adduct of hexachlorocyclopentadiene be employed with the zinc borate and antimony trioxide.

The antimony trioxide ($Sb_2O_3$) may be produced by any suitable process. The amount of antimony trioxide employed varies from about 5 to about 100 parts by weight per hundred rubber (phr) preferably from about 10 to about 25 phr.

The zinc borate ($xZnOyB_2O_3$) employed is usually available in the hydrated form. A preferred zinc borate has the formula $2ZnO . 3B_2O_3 . 3.5H_2O$, and may be manufactured by the process described in U.S. Pat. No. 3,718,615. This zinc borate is available commercially under the tradename FIREBRAKE® ZB flame retardant. The amount of zinc borate employed varies from about 5 to about 100 phr, preferably from about 10 to about 25 phr.

The third component of the fire retardant package is an adduct of hexachlorocyclopentadiene. One of the adducts employed is perchloropentacyclodecane, which is typically produced by the aluminum chloride-catalyzed dimerization of hexachlorocyclopentadiene in a chlorinated solvent. See U.S. Pat. No. 2,724,730. Perchloropentacyclodecane has a very high melting point (485° C), is quite unreactive chemically, and is moderately soluble in a number of organic solvents. This dimer is commercially available from Hooker Chemical Company under the tradename DECLORANE® 510.

The other adduct employed in the instant composition is the Diels-Alder product may be adding 2 moles of hexachlorocyclopentadiene to one mole of the stable cis-isomer of 1,5-cyclooctadiene. The structure of the adduct is:

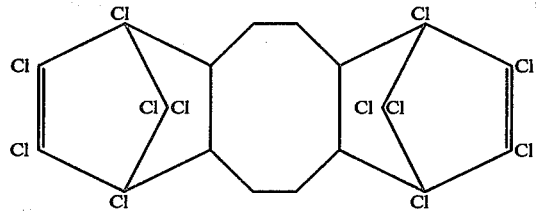

This compound has the name 1,2,3,4,7,8,9,10,13,13,14,14-dodecachloro1,4,4a,5,6-,6a,7,10,10a,11,12,12a-dodecahydro-1,4:7,10-dimethoanodibenzo[a,e] cyclooctone or 1,5-bis(chlorendo)-cyclooctene. One method to prepare the compound is disclosed in U.S. Pat. No. 3,385,819. This adduct is commercially available from Hooker Chemical Company under the tradenames DECHLORANE® Plus 25 and 515.

The quantity of the adduct of hexachlorocyclopentadiene employed varies from about 20 to about 300 phr, preferably from about 80 to about 200 phr.

The compositions of the present invention are especially superior for use as insulators for electrical conductors not only because of their superior electrical properties, but also for their unexpectedly high degree of adherence to metallic surfaces without special treatment of such surface. The electrical conductors usually employed with the instant compositions are metallic wires such as copper, silver, aluminum, and alloys thereof.

The invention is further illustrated by reference to the following Illustrative Embodiment, which is presented for the purpose of illustration only, and the invention is not to be limited to the particular ingredients or amounts disclosed.

ILLUSTRATIVE EMBODIMENT I

In illustrative Embodiment I, seven wire coating compositions were formulated and extrusion coated on an 18 AWG bare copper wire. In each case, the block copolymer employed was a selectively hydrogenated styrene-butadiene-styrene block copolymer (SEBS). Other common ingredients included a rubber compounding oil, polypropylene resin, talc filler, and an antioxidant package. The antioxidants included Irganox 1010, Irganox 1024, and Plastonox DLTDP.

The use and amount of fire retardants was varied in each formulation. The various formulations are listed below in Table 1.

Two tests were performed on each polymer composition. The Limiting Oxygen Index value was measured on the stripped-off insulation according to ASTM test D 2863. The Horizontal Burning Time was measured on the coated wired according to SAE test J878a, paragraph 5.7. These various results are also presented below in Table 1.

Table 1

| Composition No. | 1 | 2 | 3 | 4 | 5 | 6 | 7 |
|---|---|---|---|---|---|---|---|
| Component | | | | | | | |
| Block Copolymer | 100 | 100 | 100 | 100 | 100 | 100 | 100 |
| Oil | 50 | 50 | 50 | 50 | 50 | 50 | 50 |
| Polypropylene | 120 | 120 | 120 | 120 | 120 | 120 | 120 |
| Talc filler | 50 | 50 | 50 | 50 | 50 | 50 | 50 |
| Antioxidant | | | | | | | |
| Irganox 1010 | 2 | 2 | 2 | 2 | 2 | 2 | 2 |
| Irganox 1024 | 0.3 | 0.3 | 0.3 | 0.3 | 0.3 | 0.3 | 0.3 |
| Plastonox DLTDP | 0.4 | 0.4 | 0.4 | 0.4 | 0.4 | 0.4 | 0.4 |
| Fire Retardants | | | | | | | |
| $Sb_2O_3$ | 120 | — | — | 20 | — | 10 | 0 |
| Dechlorane + 25 | — | 120 | — | 100 | 100 | 100 | 0 |
| Zinc borate | — | — | 120 | — | 20 | 10 | 0 |
| Formula Weight | 442.7 | 442.7 | 442.7 | 442.7 | 442.7 | 442.7 | 322.7 |
| Tests | | | | | | | |
| A) Limiting Oxygen Index | 20.1 | 22.1 | 18.6 | 25.1 | 22.5 | 25.2 | 17.8 |
| B) Horizontal Burning Time ("C" indicates "consumed") | C | C | C | 10 seconds to self-extinguish | C | 15 seconds to self-extinguish | C |

What is claimed is:
1. An oil-resistant, fire-resistant polymer composition comprising:
  (a) 100 parts by weight of a block copolymer having at least two polymer end blocks A and at least one polymer mid block B, each block A being a non-elastomeric polymer block of a monoalkenyl arene having an average molecular weight of between about 2,000 and about 125,000 and each block B being an elastomeric hydrogenated polymer block of a conjugated diene, having an average molecular weight between about 10,000 and about 250,000;
  (b) 0–200 parts by weight of an extending oil;
  (c) 10–300 parts by weight of a polymeric alpha-olefin;
  (d) 0–200 parts by weight of an inorganic filler;
  (e) 5–100 parts by weight of antimony trioxide;
  (f) 5–100 parts by weight of a zinc borate; and
  (g) 20–300 parts by weight of a flame retardant selected from the group consisting of a perchloropentacyclodecane, the adduct

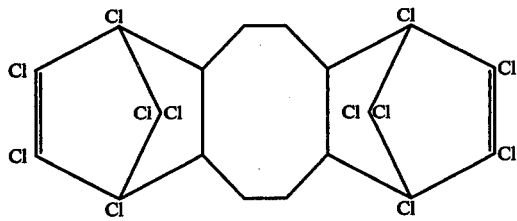

and mixtures thereof.

2. A composition according to claim 1 wherein said polymeric alpha-olefin is isotactic polypropylene.
3. A composition according to claim 1 wherein said inorganic filler is selected from the group consisting of talc, calcium carbonate, and clay.
4. A composition according to claim 1 wherein the A block is styrene and the conjugated diene block is butadiene.
5. A composition according to claim 1 wherein the amount of extending oil varies from about 50 to about 100 parts by weight.
6. A composition according to claim 1 wherein the molecular weight of the A blocks are between about 5,000 and 50,000 and the molecular weight of the B blocks are between 30,000 and 150,000.
7. A composition according to claim 1 wherein the flame retardant is perchloropentacyclodecane.
8. A composition according to claim 1 wherein the zinc borate has the formula $2Z_nO \cdot 3B_2O_3 \cdot 3.5H_2O$.
9. A composition according to claim 1 wherein the flame retardant (g) is the adduct

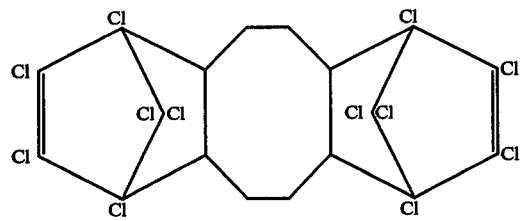

10. A composition according to claim 1 wherein the amount of antimony trioxide is from about 10 to about 25 parts, the amount of zinc borate is from about 10 to about 25 parts, and the amount of the flame retardant (g) is from about 80 to about 200 parts.

* * * * *